United States Patent [19]

Hopkins

[11] 4,000,667

[45] Jan. 4, 1977

[54] BENDING BAR CONSTRUCTED BY BENDING

[75] Inventor: David Alan Hopkins, Detroit, Mich.

[73] Assignee: The Valeron Corporation, Detroit, Mich.

[22] Filed: May 12, 1975

[21] Appl. No.: 576,964

[52] U.S. Cl. .............................. 76/101 R; 29/414; 76/101 A

[51] Int. Cl.² ......................................... B21K 21/00

[58] Field of Search ............. 29/96, 414, 557, 558; 76/101 A, 101 R, 108 R, 108 A

[56] References Cited

UNITED STATES PATENTS

| 1,995,234 | 3/1935 | Wenzlick | 76/108 R |
| 2,091,128 | 8/1937 | Anderson | 76/108 R |
| 2,310,992 | 2/1943 | Proksa | 29/96 X |
| 3,015,241 | 1/1962 | Kurwal | 29/96 X |
| 3,241,404 | 3/1966 | Sirola | 29/96 X |

Primary Examiner—Leon Gilden
Attorney, Agent, or Firm—Farley, Forster and Farley

[57] ABSTRACT

A pair of boring bars are constructed from a single double length straight bar by providing a central bend of suitable angle and curvature to provide a pair of offset supports for a pair of cutting inserts having cutting points projecting to an offset cutting position relative to the periphery of the bar. Cutting out a small segment at the center of the bend provides two boring bars with curved ends. Machining of a chip clearance path and insert pocket on one side or the other of each bar completes a pair of left or a pair of right or opposite hand boring bars.

8 Claims, 3 Drawing Figures

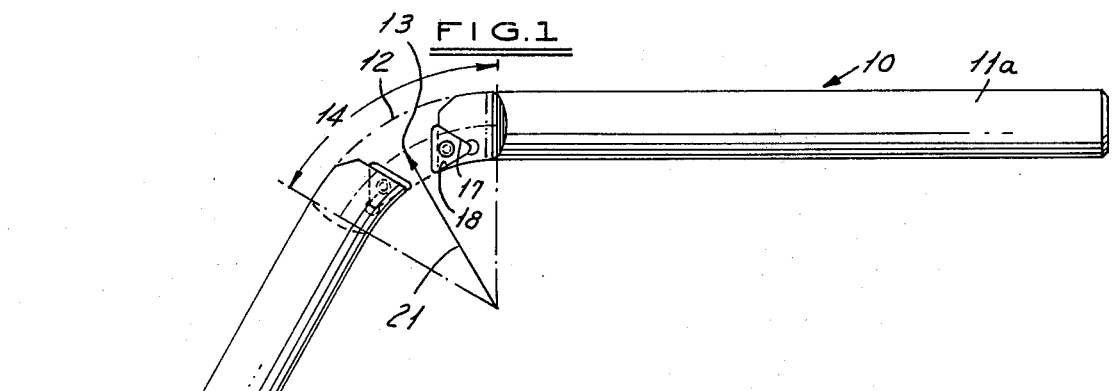
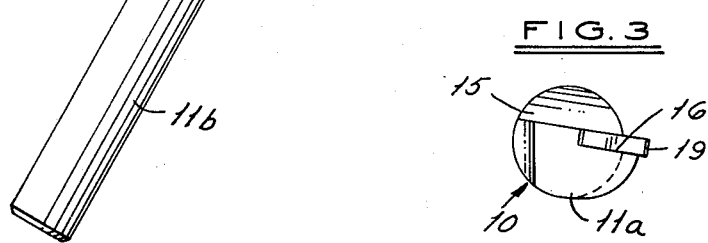
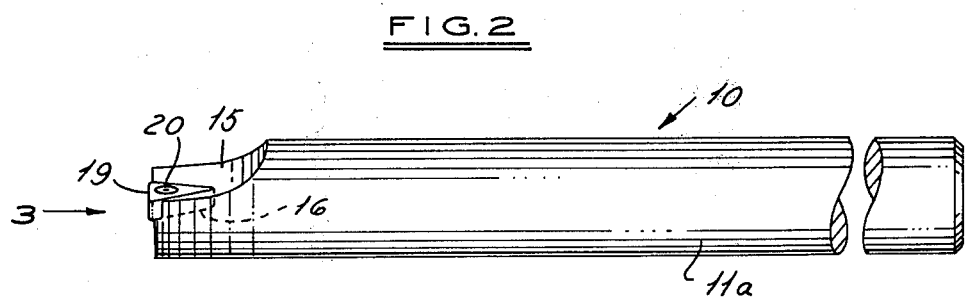

BENDING BAR CONSTRUCTED BY BENDING

BACKGROUND OF THE INVENTION

Throw away insert boring bars are conventionally machined from round bar stock which is sufficiently oversize relative to the finished boring bar diameter to provide stock for an offset support under the cutting corner of a throw away insert installed thereon. The machining operation is normally performed by turning down to suitable diameter the entire length of the boring bar with the exception of the cutting end which is thereupon further machined to provide for chip clearance and an insert pocket. This machining also involves removal of superfluous end stock which does not directly contribute to the offset support of the cutting insert. Such conventional manufacturing procedures involve a considerable amount of machining with a number of machining setups required in addition to those involved in providing the chip relief and insert pocket. A large amount of scrap material is involved in such procedures.

Relatively small diameter boring (less than ½ inch diameter) are known to have been produced singly by providing asharp 90° offset bend at the cutting end which was heat treated and ground with an integral cutting point. The severe forming of a sharp right angle bend required heating of the end to a forging temperature and heat treatment of the bar following the bending operation to harden the material. Such heat treatment results in distortion of the bar shape along its length; and the entire bar must be constructed of relatively expensive tool steel in order to provide a durable cutting point.

SUMMARY OF THE INVENTION

This invention relates to boring bars manufactured in a pair by bending a double length bar at the center, cutting out a central segment of the bent portion leaving two bent ends providing offset stock for mounting offset throw away cutting inserts with offset bar stock supporting the cutting point of the insert. Insert pockets for locating throw away inserts, preferably of the indexable form, are machined in the respective bent ends along with chip clearance reliefs to complete the respective boring bars. Each bar may be machined for either right or left hand use. There is no need for turning the main body of the bar to finished diameter and removing excess stock from the remaining enlarged cutting end of the bar which is not employed in supporting the offset cutting insert.

DESCRIPTION OF THE DRAWINGS

FIG. 1 is a plan view of a pair of finished boring bars shown in angular juxtaposition illustrating the form of the parent bar following the initial bending operation;

FIG. 2 is an enlarged side elevation of a single bar comprising the right hand bar of the pair illustrated in FIG. 1; and FIG. 3 is an end view of the bar taken along the line 3 of FIG. 2.

DESCRIPTION OF THE PREFERRED EMBODIMENT

As illustrated in the drawings, a single double length bar 10, which in the case of precision boring bars is preferably initially in the form of accurately straight centerless ground bar stock, of suitable steel such as Hi-Ten B3X, is cold formed for two boring bars 11a, 11b, by bending a central portion 12, including a wedge shaped portion 13 to be discarded, through a suitable angle 14. After cutting off the respective bars 11a, 11b from the wedge portion 13, each bar is machined with a chip clearance relief 15 and an insert pocket having a bottom seat 16 machined with appropriate axial and radial rake angles and normal shoulder walls 17 and 18 for a triangular indexable insert 19 secured in the pocket by screw means extending through a central aperture in the insert (omitted from FIG. 3) or other conventional means.

A suitable gradual center line radius 21, such as a 2 inch radius extending through a bend 14 of 60° in the case of a ¾ inch diameter boring bar, permits the bend to be cold formed out of boring bar stock of suitable strength without any distortion or deformation of the main boring bar body. The correct ratio of bending radius to boring bar diameter is important — if too large an inadequate amount of offset will result and the closest settings of tool holder support will be unduly limited; while if too small undue strain and fracturing of the bar will result. An optimum ratio of neutral axis radius has been found to be 2⅔ times bar diameter — approximately midway within a practical range of 1.5 to 3.75 times bar diameter. 60° provides a preferred angle of bend within a practical range of 45° to 75°. Offset bar support for the offset cutting point of the indexable triangular insert is automatically provided by the bend in the end of the bar and any need for removal of surplus stock, as at the cutting end of a conventionally manufacturing boring bar is completely avoided.

The removal of the central wedge shaped portion 13 from the center of the bend 12 will be seen to accommodate the point of a triangular indexable insert having one supported cutting edge extending normal to the axis of the boring bar, as may be desirable in counterboring to a limited depth and a square end shoulder. However, it will be understood that square or other insert forms may be used.

The central bending of a double length bar enables this method of manufacture to be applied to boring bars of 1 inch dia. and smaller by the simple use of a hand operated bending fixture and bars of unlimited larger diameter having similar proportions may likewise be formed with power bending apparatus.

I claim:

1. The method for manufacturing a boring bar comprising the steps of bending a straight bar to provide an intermediate curved portion and an obtuse included angle relationship between the remaining straight portions, cutting the curved portion of said bar to provide a curved end portion on each of two straight portions, machining a chip clearance path and an insert pocket with an offset portion resulting from said bend providing a support surface for an offset cutting point of an insert.

2. The method of claim 1 including the cutting of an end wall for said bent end extending substantially normal to the longitudinal center line of said bar.

3. The method of claim 1 wherein said bending step is a cold forming operation.

4. The method of claim 1 wherein said intermediate curved section extends through an arc in the order of 60°.

5. The method of claim 4 including the removal of a wedge having an included angle in the order of 60° from a central portion of said intermediate curved portion thereby providing end walls extending substantially normal to the longitudinal centerline of said bar.

6. The method of claim 1 wherein said intermediate curved section extends through an arc within the range of 45° to 75°.

7. The method of claim 1 applied to a round boring bar to provide a neutral axis bend radius within the range of 1.5 to 3.75 times the bar diameter.

8. The method of claim 1 applied to a round boring bar to provide a neutral axis bend radius in the order of 2⅝ times the bar diameter.

* * * * *

UNITED STATES PATENT AND TRADEMARK OFFICE
CERTIFICATE OF CORRECTION

PATENT NO. : 4,000,667
DATED : January 4, 1977
INVENTOR(S) : David Alan Hopkins

It is certified that error appears in the above-identified patent and that said Letters Patent are hereby corrected as shown below:

Change the title from "Bending Bar Constructed by Bending"

to: "Boring Bar Constructed By Bending"

Signed and Sealed this

Twelfth Day of April 1977

[SEAL]

Attest:

RUTH C. MASON
*Attesting Officer*

C. MARSHALL DANN
*Commissioner of Patents and Trademarks*